United States Patent [19]

Roelle

[11] Patent Number: 5,277,080
[45] Date of Patent: Jan. 11, 1994

[54] MANUALLY ACTUATED FURNITURE CONTROL

[76] Inventor: David R. Roelle, 42 Champion Pines, Conroe, Tex. 77303

[21] Appl. No.: 983,038

[22] Filed: Nov. 30, 1992

[51] Int. Cl.⁵ .......................... F16C 1/10; A01D 69/10
[52] U.S. Cl. ............................. 74/501.5 R; 74/502.4; 74/523; 74/528; 56/11.3; 56/10.5; 56/10.8
[58] Field of Search ............. 74/500.5, 501.5, 501.5 H, 501.6, 502, 502.1, 502.4, 502.6 538; 297/86, 87; 56/10.5, 10.8, 10.2, 11.3

[56] References Cited

U.S. PATENT DOCUMENTS

| | | | |
|---|---|---|---|
| 4,428,180 | 1/1984 | Carlson | 56/11.3 |
| 4,464,951 | 8/1984 | Courbot | 74/501.5 R |
| 4,580,822 | 4/1986 | Fukumoto | 292/336.3 |
| 4,753,062 | 6/1988 | Roelle | 56/10.5 |
| 4,833,935 | 5/1989 | Roelle | 56/10.8 |
| 4,881,423 | 11/1989 | Troiano | 74/501.6 |
| 4,975,988 | 12/1990 | Won | 74/505 X |
| 5,010,780 | 4/1991 | Hatfield | 74/502.4 |
| 5,056,862 | 10/1991 | May et al. | 297/85 |
| 5,107,720 | 4/1992 | Hatfield | 74/502 |

Primary Examiner—Vinh T. Luong

[57] ABSTRACT

A manual control for controlling the release of a latching mechanism of a piece of motion furniture including a housing to be mounted on the furniture, a lever to be pivotally mounted within the housing, a spring positioned between the lever and housing to urge the lever toward its inactive position, means on the lever to support the spring on the lever during mounting of the lever within the housing and allow release of one end of the spring to engage the housing, a cable sheath structure, an arcuate recess on the lever and having means to connect one end of the cable to the lever, means restricting entry of the cable into said arcuate recess to avoid undesired release of the cable therefrom, means on the housing for receiving one end of the cable sheath, the lever having a handle portion which is sufficiently large to limit the entry of more than the first joint of fingers into the housing below the lever handle, such handle portion having sufficient area on its outer surface to allow a logo to be embossed thereon, and a fixture, such as a Ping-Pong ball, to position in the housing recess under the lever handle to retain it a short distance from its inactive position during connection of the opposite ends of the cable and sheath to the chair latching mechanism to provide the desired amount of overtravel to avoid having to adjust the position of the end of the cable.

10 Claims, 4 Drawing Sheets

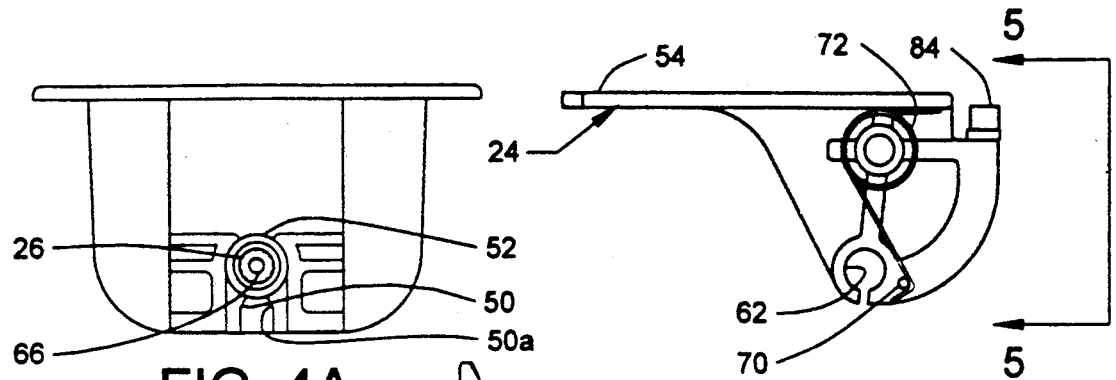
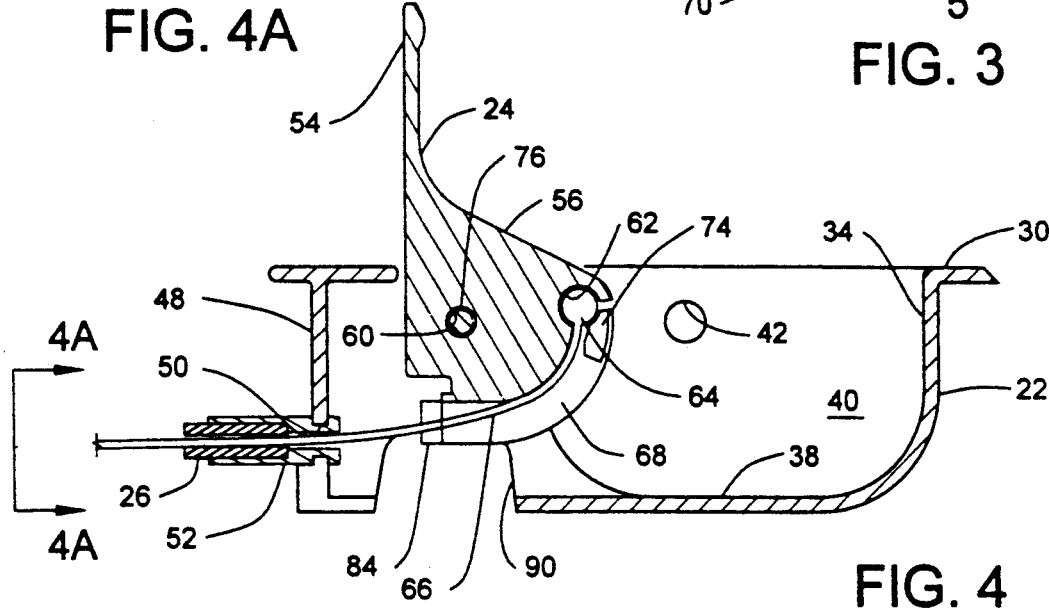
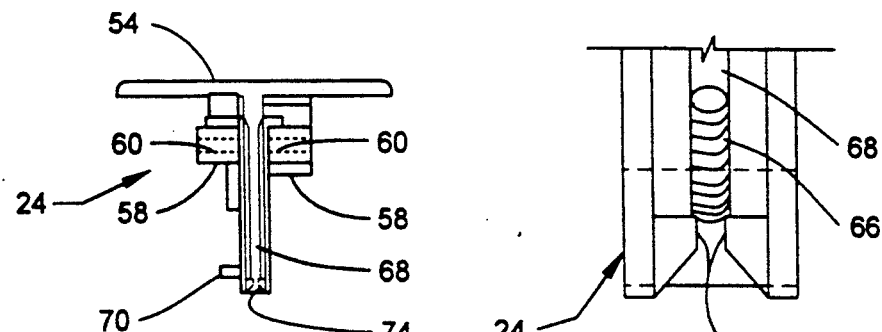

MANUALLY ACTUATED FURNITURE CONTROL

BACKGROUND

The present invention relates to an improved manually actuated control for releasing the position of elements of motion furniture, such as a recliner chair.

Prior to the present invention, manual controls have ranged from handles positioned between an arm and an adjacent seat cushion or on the exterior of the arm. Normally such handles can either move the components of the chair or move a cable in a sheath with the lever installed in the arm. The arm is connected to a suitable portion of a mechanism which may be a latch which maintains the chair in its upright position until released or other suitable mechanism coacting with the chair components for controlling their position.

U. S. Pat. No. 5,056,862 discloses a recessed lever actuator for a recliner mechanism which includes a housing with a lever pivotally mounted therein which are mounted in an opening in the arm of the chair. The lever is connected to a cable sheath structure which extends to lock links which secure the chair mechanism from movement until released by actuation of the lever. The handle of the lever is a generally flat structure having a central opening therethrough and connects to the lever body which is pivotally mounted therein and is spring biased to its position with the handle within the upper portion of the housing.

U. S. Pat. No. 5,107,720 discloses a flexible cable and sheath combination connecting to a latch mechanism from an actuator installed in the outside portion of the arm. The actuator includes a housing having a recess into which the lever is inserted and a pin which pivots the lever to the housing. The lever includes two positions to which the cable may be secured and the housing has two positions to which the cable sheath may be secured. The torsion spring which resists the movement of the lever is installed so that lever movement tends to unwind the spring rather than the preferred winding of the spring and the torsion spring is wound around a shaft on which the lever is mounted and between the lever and the housing. This and other prior patents have a problem of not protecting the fingers of the person in the chair, particularly at a time which the person returns the leg rest to its retracted position. This can cause the individuals fingers to be trapped therein. Further the amount of travel and the mechanical advantage of such prior devices are able to do the job but such prior devices could be more efficient if their mechanical advantage and length of travel were increased. With overtravel a cable system does not require the end position of the cable sheath at the latch mechanism to be adjustable as shown in FIG. 3 of U. S. Pat. No. 5,107,720 which discloses a slotted sheath connection. One disadvantage of prior systems is that the cable is maintained under tension at all times which is undesirable for the cable and sheath structure and other control head components, especially if a component is made of a plastic subject to creep.

Similar manual actuators have been used in the automobile industry to release the automobile door for opening. An example of one type of car door structure is shown in the Fukumoto U.S. Pat. No. 4,580,822.

SUMMARY

The present invention relates to an improved manually operated control for a piece of furniture having movable components. The improved furniture control includes a housing with a recess which can be mounted in an arm of the furniture, a lever which is pivotally mounted in the housing recess with a handle portion approximately parallel with the outer edges of the housing surrounding the recess, a shaft on the lever through which the lever is pivotally mounted to the housing by a suitable pin, and a torsion spring surrounding the shaft of the lever on one side thereof having one end engaging the lever and the opposite end adapted to engage the housing to bias the lever to its returned or non-actuated position. The lever includes a projection on the side thereof on which the spring is mounted which projects outwardly from the lever a sufficient distance to engage the end of the spring which is to engage the housing retaining the spring on the lever during assembly until the spring end is released from the projection and engages the housing. The lever includes an arcuate recess forming a radially outwardly facing cable receiving groove or track which terminates at one end in an opening extending parallel to said shaft sufficient to receive the cylindrical cable end therein and a pair of opposed projections in the track spaced from the bottom thereof and defining a restricted space therebetween through which the cable may be forced manually but through which it will not pass without intentional force being applied to the cable to pull it through such restricted space. The arcuate cable receiving groove is sufficiently long to receive all of the cable pulled from the sheath through its end fitting which is secured in the housing at a positioned aligned with the track. The lever includes a resilient stop element to engage the housing when the cable returns to its inactive position to prevent shock to the structure from sudden movement of the movable components of the chair and to reduce objectionable operation noises.

An object of the present invention is to provide an improve manual control for motion furniture which protects the fingers of the person using the furniture control from finger injury.

Another object of the present invention is to provide an improved manual control for motion furniture having a cable and sheath connection which does not maintain the cable under tension at all times after its connection to the furniture.

A further object of the present invention is to provide an improved manual control for motion furniture having increased mechanical advantage and travel over the prior art structures.

A still further object of the present invention is to provide an improved manual control for motion furniture having a preselected actuator in which the mechanical advantage and length of travel is varied during the stroke of the actuator.

Still another object of the present invention is to provide an improved manual control for motion furniture which is easily installed in the furniture.

Another object of the present invention is to provide an improved method of installing the spring on the lever when the lever is being installed in the housing and then releasing the spring to engage the housing.

A still further object of the present invention is to provide an improved method of maintaining a preselected position of the lever during connection of the sheath and cable to the furniture latching mechanism.

BRIEF DESCRIPTION OF THE DRAWINGS

These and other objects and advantages of the present invention are hereinafter set forth and explained with reference to the drawings wherein:

FIG. 3 is an enlarged view of the lever illustrating the spring installed thereon prior to installation in the housing.

FIG. 4 is an enlarged side elevation view of the arcuate recess or track of the lever to illustrate the connection of the cable cylindrical end therein. FIG. 4A is an end view of the housing taken along line 4A—4A in FIG. 4 to illustrate the slot therein in which the sheath is connected.

FIG. 5 is an end view of the lever taken along line 5—5 in FIG. 3 and FIG. 5A is an enlarged view of the arcuate recess of the lever to illustrate the cable retention projections on the interior of the recess.

DESCRIPTION OF THE PREFERRED EMBODIMENT

Figure 1:
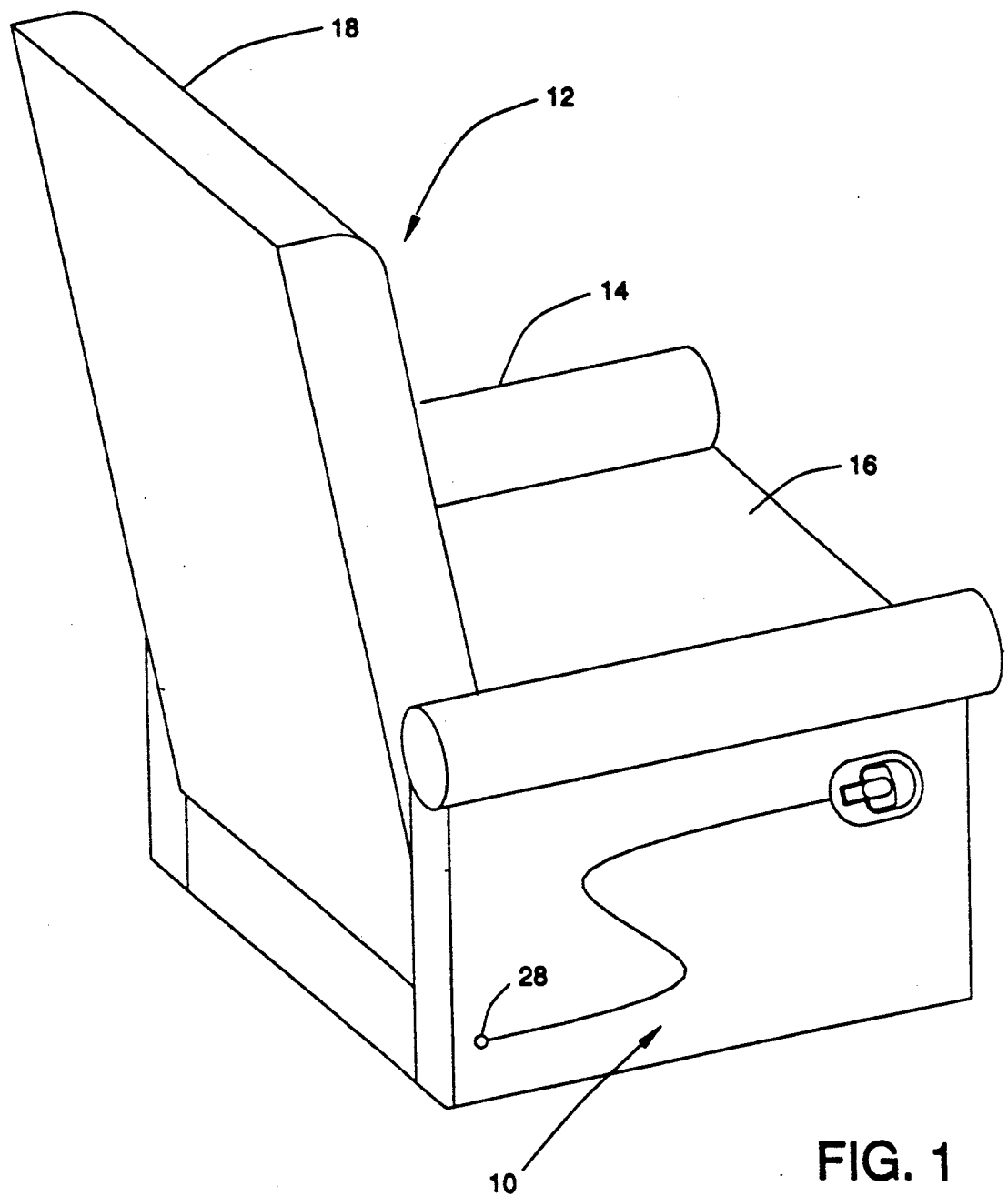
FIG. 1 is a perspective view of a piece of motion furniture on which the improved manual control has been installed.

As shown in FIG. 1, the control system 10 of the present invention is installed on a piece of motion furniture such as the recliner chair 12. Recliner chair 12 includes arms 14 which are suitable connected to provide a foundation for the remainder of the chair, a seat 16, a back 18 and an extendible leg rest (not shown). Suitable mechanism (not shown) is provided to support the seat 16, back 18 and leg rest from the foundation of chair 12 and under control of the individual sitting in chair 12 to allow desired movement of the seat 16, back 18 and leg rest in any desired manner as is fully understood in the motion furniture industry. Control system 10 as hereinafter described is intended to provide the individual with the option of sitting in chair 12 with the components thereof fixed in the folded position or actuation of control system 10 to allow the components to unfold into a reclining position.

Figure 2:
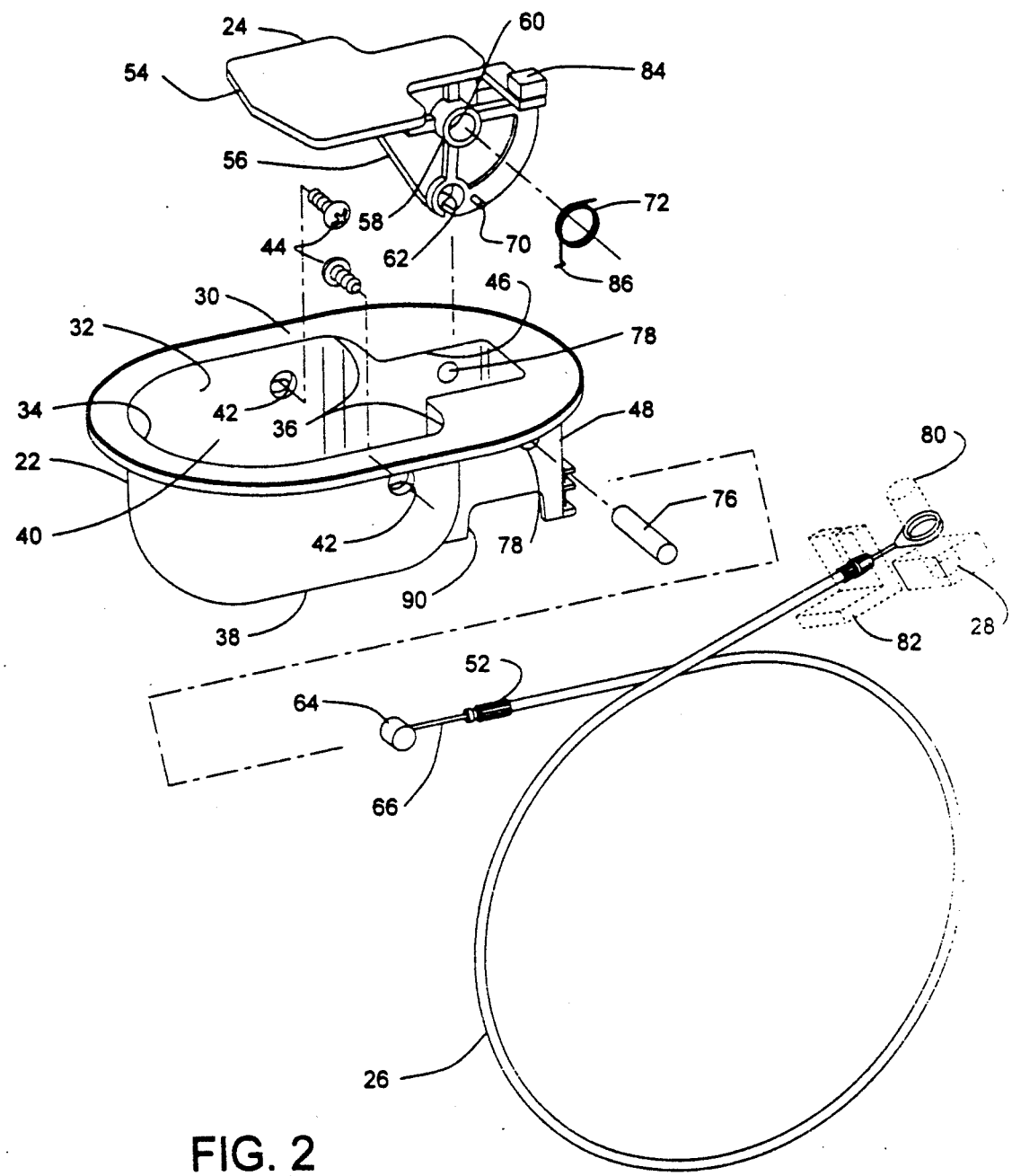
FIG. 2 an exploded view of the improved manual control.

Control system 10, as shown in FIG. 2, includes housing 22 and lever 24 mounted therein, cable-sheath structure 26 connecting from housing 22 and lever 24 to the latching mechanism 28 which controls the unlatching of the mechanism which supports back 16, seat 18 and leg rest. Latching mechanism 28 may be a simple latching device, a locking link mechanism (U.S. Pat. No. 5,056,862) or any other suitable mechanism which is normally used by the manufacturer of the motion furniture.

Housing 22 includes flat upper surface 30, straight sides 32 and rounded ends 34 and 36. Sides 32 extend away from upper surface 30 and the portions of sides 32 adjacent end 34 curve toward each other to form bottom 38 of recess 40. Aligned openings 42 through sides 32 are provided to receive suitable means 44 for securing housing 22 to its desired recessed position in arm 14. End 36 is partially curved and terminates in a slot 46 extending under upper surface 30 and having end wall 48. Slot 50 in the lower edge of end wall 48 is configured to receive sheath fitting 52 therein and includes suitable restriction 50a to retain fitting 52 therein.

Lever 24 includes handle 54 and body 56. Body 56 is generally flat, is integral with handle 54, extends from the underside of handle 54 and includes tubular means such as projections 58 on opposite sides thereof having opening 60 extending through projections 58 and body 56. The portion of body 56 away from handle 54 is arcuate in shape and is substantially thicker than the remainder of body 56. Opening 62 extends through body 56 at a position substantially below projections 58 and is sized to receive cylindrical end 64 of cable 66. Groove 68 extends along the outer arcuate portion of body 56 to receive cable 66 therein. Spring engaging means such as projection 70 extends outward from the thick arcuate portion of body 56 near opening 62 and functions as hereinafter explained with reference to FIG. 3. Resilient biasing means, such as spring 72, when installed on lever 24 surrounds one of projections 58 with one end engaging in the corner at the side of body 56 and under handle 54 and the other end engaging projection 70. In this position spring 72 is preloaded and retained on lever 24 during its installation into housing 22. When cable 66 is installed in arcuate groove 68 cable restricting means, such as projections 74 on the interior of groove 68 are positioned and spaced so that cable 66 will with force pass between projections 74 and come into engagement with the bottom of groove 68. This force may be provided, after lever is installed within housing 22 and pin 76 inserted through openings 78 and through opening 60 to pivotally mount lever 24 within housing 22, by installing cylindrical end 64 of cable 66 within opening 62 and with sheath 52 in engagement with slot 50 pivoting lever 24 to create a tension in cable 66 so that it passes through projections 74 into its desired position as illustrated in FIGS. 4, 5 and 5A. The opposite end of sheath-cable structure 26 having its cable end 80 and sheath fitting 82 appropriately connected to latching mechanism 28 shown schematically in FIG. 2. Resilient stop means, such as resilient stop 84, is supported on the end of arcuate portion of body 56 so that when lever 24 is suddenly returned to its retracted position, even with force, it does not introduce any shock into the control system 10. Resilient stop 84 is positioned to one side of groove 68 so that it does not interfere with the operation of cable 66. Resilient stop 84 could also be positioned on housing 22 to engage lever 24.

Figure 6:
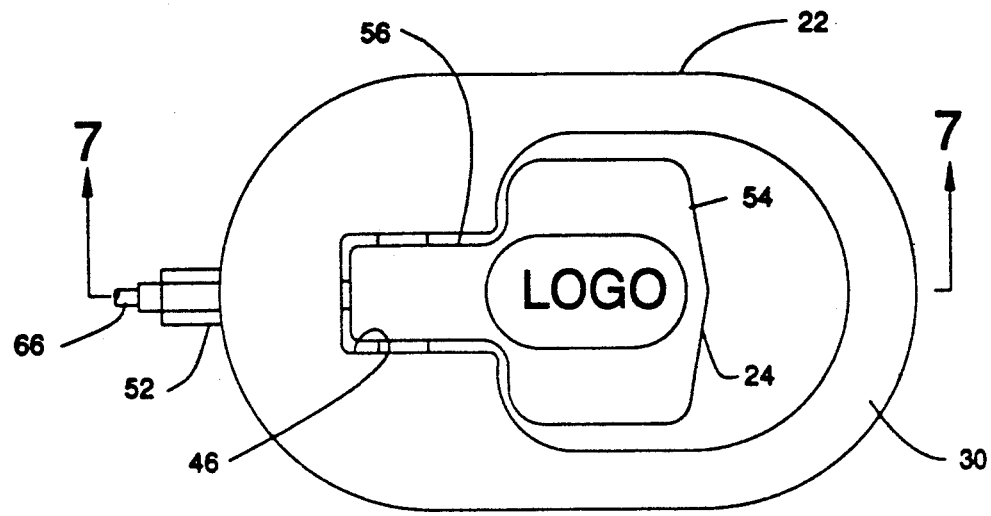
FIG. 6 is a plan view of the assembled actuator housing and operating lever.

As shown in FIG. 6, handle 54 has a surface area which is approximately 65% of the area of the recess at the lever of upper surface 30. Also, it projects across recess 40 a sufficient distance that an adult can only put two fingers into the recess 40 to engage the underside of handle 54. The top side of handle 54 has a considerable flat surface on which a suitable logo may be embossed, molded or otherwise suitably applied thereto. In the molding of handle 54 a blank insert is used to provide a plain surface when no logo is to be provided thereon but when a logo is to be provided the insert may include a mold for forming of the logo into the upper surface of handle 54. The large surface area of the handle 54 provides a limit on the extent that the to which and individual may insert fingers under the handle and also provides a the area for the logo if desired.

Lever 24 with its spring 72 positioned around one of tubular projections 58 and in engagement with projection 70 which retains spring in position, is inserted into recess 40 until opening 60 is aligned with openings 78 and then pin 76 is inserted to pivotally mount lever 24 within housing 22. Thereafter the end of spring 72 on projection 70 is wedged therefrom by a suitable implement, such as a screwdriver, and it is wedged to engage the edge 90 of housing 22.

Figure 7:
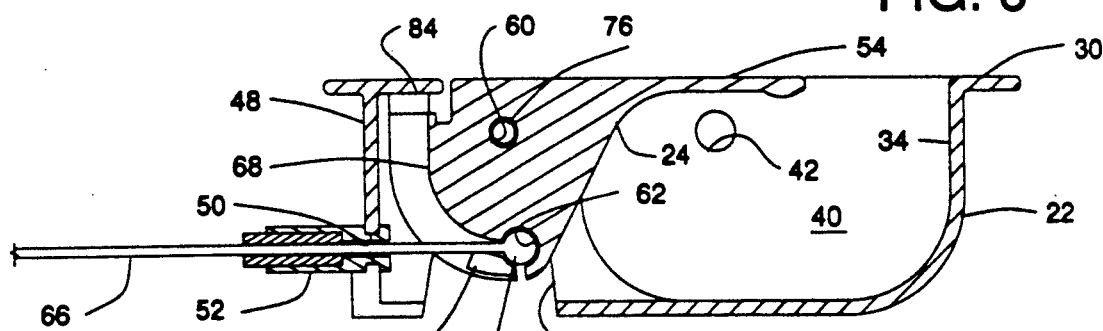
FIG. 7 is a sectional view of the assembled actuator taken along line 7—7 in FIG. 6 to illustrate the stop pad in engagement with the housing limiting the shock of the return movement of the lever during return to its non-actuated position.
Figure 8:
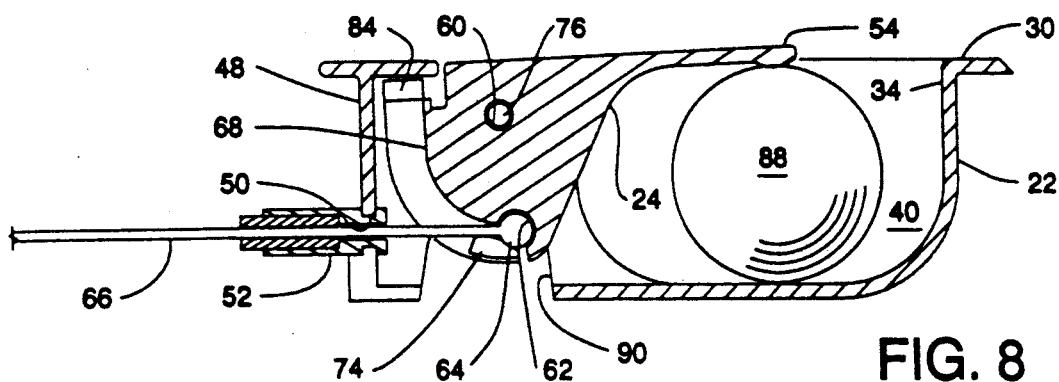
FIG. 8 is a view similar to FIG. 7 but showing the fixture which is used to maintain a slightly actuated position of the lever during installation thereof.

In FIG. 7, housing 22 and lever 24 are shown with lever 24 in its inactive position. By contrast in FIG. 8, housing 22 and lever are shown with lever 24 held a short distance above its inactive position by fixture 88 which is in the form of a light weight ball. It has been found that with the particular size of the manufactured form of the control system 10 of the present invention, that fixture 88 may suitably be a table tennis or a Ping-Pong ball. This ball has the diameter which is sufficient to allow the ball to engage the under side of handle 54 to maintain it the desired distance away from its inactive position and to allow easy connection of the cable and sheath assembly to the latching mechanism 28. Upon removal of fixture 88 slack is provided in the cable which avoids the previously mentioned problem of having tension on the cable at all times.

What is claimed is:

1. A manual control for motion furniture comprising
a housing having sides and a bottom extending across a portion between the inner ends of said sides to define a recess with a slot extending through one end thereof,
a lever having a handle and a body having an opening through the lever,
means for pivotally mounting said lever to said housing,
a cable sheath assembly having a cable, a sheath, means at each end for connecting to the sheath and means at each end for connecting to the cable,
said housing having means for receiving one end of said sheath,
said lever having an arcuate cable receiving groove with means on one end of said groove for receiving one end of said cable therein, and
means in said groove for restricting entry and exit of said cable therefrom.

2. A manual control according to claim 1 wherein
said lever is pivotally mounted in said slot in said housing with said handle parallel to the upper edges of said housing sides when in inactive position of said lever.

3. A manual control according to claim 1 including means between said lever and said housing to provide a resilient stop on return of said lever to inactive position of said lever.

4. A manual control according to claim 1 including resilient biasing means interposed between said lever and said housing to return said lever to inactive position with handle substantially parallel to the upper surface of said housing.

5. A manual control according to claim 4 wherein
said resilient biasing means includes a spring for interengaging said lever and said housing for causing rotation of said lever to inactive position after said lever has been manually moved to actuate said cable.

6. A manual control according to claim 5 including
means on said lever to retain said spring in a desired compressed position thereon during installation of said lever into said housing and in such desired position said spring can be released to engage said housing after said lever has been pivotally mounted to said housing.

7. A manual control according to claim 1 wherein said motion furniture is a chair including
means on the chair for retaining said chair in upright position, and
means for engaging the cable connecting means on the end of the cable sheath assembly away from said one end of said cable to said retaining means whereby movement of the cable releases the retaining means to allow said chair to be moved away from upright position.

8. A manual control according to claim 1 wherein
the handle portion of said lever has an area with respect to the area of said housing recess sufficient to allow access at the lever end to only the end portion of fingers of a person sitting in the chair for operation of the lever so that any sudden return of the lever to inactive position responsive to movement of the chair to upright position will not injure the person's fingers.

9. A manual control according to claim 8 wherein the enlarged area of the handle portion of the lever to prevent finger damage is sufficient to receive a reasonable sized logo of the chair manufacturer thereon.

10. A manual control according to claim 7 including
a light weight ball for positioning in said housing recess beneath said lever handle to position said lever partially away from inactive position during the connection of the other end of the sheath and cable to said latching means to provide the desired slack in said cable during adjustment of the latching end position of the cable during connection to the latching mechanism when the ball is removed from the housing recess.

* * * * *